United States Patent [19]
Baets et al.

[11] Patent Number: 5,713,200
[45] Date of Patent: Feb. 3, 1998

[54] EXHAUST SYSTEM FOR A TURBOCHARGED INTERNAL COMBUSTION ENGINE

[75] Inventors: Jozef Baets, Baden; Ennio Codan, Hausen; Christoph Mathey, Fislisbach, all of Switzerland

[73] Assignee: Asea Brown Boveri AG, Baden, Switzerland

[21] Appl. No.: 708,691

[22] Filed: Sep. 5, 1996

[30] Foreign Application Priority Data

Oct. 25, 1995 [DE] Germany .................. 195 39 572.7

[51] Int. Cl.⁶ .................................................. F02B 37/02
[52] U.S. Cl. .................................. 60/280; 60/323; 60/597
[58] Field of Search .......................... 60/280, 313, 323, 60/597, 598, 605.1

[56] References Cited

U.S. PATENT DOCUMENTS 2,674,086  4/1954  Nichols ........................ 60/323

FOREIGN PATENT DOCUMENTS

| 1004861 | 3/1957 | Germany . |
| 2852736 | 6/1980 | Germany . |
| 3940992A1 | 6/1991 | Germany . |
| 3200521C2 | 10/1992 | Germany . |

*Primary Examiner*—Michael Koczo
*Attorney, Agent, or Firm*—Burns, Doane, Swecker & Mathis, L.L.P.

[57] ABSTRACT

A simple exhaust system is disclosed with improved operational reliability and an increased service life for a turbocharged internal combustion engine, in which system both the advantages of shock-wave charging and those of pulse-converter charging are used, depending on the operating state of the internal combustion engine. These advantages are achieved by virtue of the fact that extension pieces (12, 13) are formed for the shock pipes (6, 7) and are arranged upstream of the connection line (8, 9) furthest away from the exhaust turbine (5). Each shock pipe (6, 7) is connected to a corresponding extension piece (12, 13). The interconnection conduit/s (14) is/are formed between the extension pieces (12, 13). Each interconnection conduit (14) has a cross-sectional constriction (15).

5 Claims, 1 Drawing Sheet

EXHAUST SYSTEM FOR A TURBOCHARGED INTERNAL COMBUSTION ENGINE

BACKGROUND OF THE INVENTION

1. Field of the Invention

The invention relates to an exhaust system for a turbocharged internal combustion engine.

2. Discussion of Background

Exhaust systems for turbocharged internal combustion engines serve to carry the exhaust gases from the internal combustion engine to the exhaust turbine of the turbocharger and, at the same time, to make optimum use of the available energy of the exhaust gases. Known methods for turbocharging internal combustion engines are constant-pressure and shock-wave charging and the pulse-converter method.

In the case of constant-pressure charging, the exhaust gases from all the cylinders of the engine are introduced into a common exhaust conduit and then fed to the exhaust turbine. In full-load operation of the engine, i.e. in the case of a high expansion-pressure ratio of the exhaust turbine, particularly good use is made of the available energy of the exhaust gases. If, on the other hand, the internal combustion engine is operated at reduced load or speed, i.e. predominantly in the part-load range, the turbine power in steady-state operation and the surplus power for the acceleration of the turbine rotor are very low.

In the case of shock-wave charging, either one or more separate exhaust conduits are provided, to each of which two or more cylinders are connected. In all cases, only those cylinders are connected to one another whose exhaust opening times overlap only slightly or not at all. The pressure energy in the cylinder is transmitted to the exhaust turbine by pressure waves and only slight pressure losses occur. In the case of a sudden acceptance of a higher load by the engine, a high proportion of the available pressure energy is carried virtually without delay to the exhaust turbine by the pressure waves as soon as a higher quantity of fuel is burnt in the engine. In addition, the pressure energy is maintained in the exhaust lead owing to the narrowness of the exhaust conduits, for which reason it is possible to increase the energy available for the exhaust turbine, particularly at part load. Consequently, shock-wave charging of internal combustion engines is always preferred whenever good part-load behavior or dynamic behavior in the case of changes in load is required. However, poorer results are obtained with this method at full load.

DE-A1 39 40 992 has disclosed a solution which improves the full-load behavior in the case of a method for shock-wave charging. For this purpose, the shock pipes leading to the exhaust turbine from a four-stroke internal combustion engine are connected to one another. Arranged in the interconnection conduit is a shut-off element which can be adjusted between an open position for higher speeds and a closed position for low speeds. The exhaust system thus operates in shock-wave mode at part load and with the shut-off element closed. At full load, on the other hand, the shut-off element is open and, as a result, the behavior of the exhaust system approaches that of constant-pressure charging.

However, there is a disadvantageous effect with this solution that the interconnection conduit and hence also the shut-off element are arranged immediately upstream of the exhaust turbine. All the components situated in this area of high thermal stress are subject to severe wear. The life of moving components, in particular, is therefore relatively short and it is thus necessary to replace the shut-off element at frequent intervals. If replacement is not effected in good time, the exhaust system can no longer be matched in an optimum manner to the operating state of the internal combustion engine. The boost is therefore reduced and the internal combustion engine does not achieve the required power. Owing to the proximity between the shut-off element and the exhaust turbine, there is furthermore the risk that parts of the shut-off element will become detached, enter the exhaust turbocharger and destroy the exhaust turbine.

When using a pulse converter, two or more exhaust conduits are combined like an ejector ahead of the exhaust turbine. Owing to the nozzle-like constriction of the exhaust conduits which this involves, the flow is accelerated and the transmission of the respective pressure waves to the adjacent conduit is prevented. This makes it possible to connect even cylinders with overlapping exhaust opening times without them having a negative effect on each other. It is thus possible, by using a pulse converter, to use shock-wave charging effectively even at full load of the internal combustion engine, but the part-load behavior approaches that of constant-pressure charging.

DE-C2-32 00 521 has disclosed a solution in which a switch from shock-wave charging to the pulse-converter method is possible. For this purpose, the two previously parallel exhaust conduits converge until they reach a common conduit component. Arranged rotatably in this conduit component is an intermediate wall. When the intermediate wall is closed, shock-wave charging is implemented. With the intermediate wall open, charging of the internal combustion engine is by the pulse-converter method.

A disadvantage of this solution is that the constriction of the exhaust conduits required for the pulse-converter method is located in the main stream of the exhaust gases even in the case of the shock-wave mode. The main flow is thereby restricted and an energy loss thus occurs. In addition, the wear problems already described above can also occur at the intermediate wall of the two exhaust conduits.

SUMMARY OF THE INVENTION

Accordingly, one object of the invention is to provide a novel, simple exhaust system with improved operational reliability and an increased service life for a turbocharged internal combustion engine, in which system both the advantages of shock-wave charging and those of the pulse converter are used, depending on the operating state of the internal combustion engine.

According to the invention, this is achieved by virtue of the fact that extension pieces are formed for the shock pipes and are arranged upstream of the connection line furthest away from the exhaust turbine. Each shock pipe is connected to a corresponding extension piece. The interconnection conduit/s is/are arranged between the extension pieces. Each interconnection conduit has a cross-sectional constriction, preferably designed as an orifice.

During the operation of the system, the mass flow of the exhaust gases passes directly from the cylinders of the internal combustion engine, via the shock pipes, directly into the exhaust turbine without loss of energy. Since the interconnection conduit is arranged a relatively long way away from the exhaust turbine, all that takes place through it is a pressure equalization between the shock pipes. Because of the cross-sectional constriction in the interconnection conduit, only a small part of the quantity of exhaust gas is introduced into the adjacent shock pipe with each pressure surge of the cylinders, and, as a result, the cylinders connected there are not interfered with. The pressure equalization leads to a reduced pressure in the shock pipes being supplied by one or more cylinders and to an increased pressure in the shock pipes or the other shock pipes. The pressure fluctuations in the shock pipes are thus reduced, leading to improved turbine efficiency. In this way, good results can be achieved at full load, even given the shock-wave charging. Because no moving components are used, the design of the exhaust system is simpler and its service life is increased.

It is particularly advantageous if a jump in cross-section is formed at the transition from the extension pieces to the respective interconnection conduit and if each interconnection conduit has an additional volume. This capacity results in damping and hence to a lengthening of the action of the pressure waves, i.e. these take longer to pass from one shock pipe to the other. In this way, the pressure fluctuations are further reduced and, by this means, the behavior at full load improved.

It proves advantageous if a shut-off element which can be adjusted between an open position for high speeds of the internal combustion engine and a closed position for low speeds is arranged in the cross-sectional constriction of the interconnection conduit. It is thereby possible to achieve pure shock-wave charging at part load and with the shut-off element closed. At full load, on the other hand, the shut-off element is opened, giving rise to pulse-converter charging. In this arrangement, the shut-off element is arranged upstream of the connection conduits of the internal combustion engine. In this area of the exhaust system, which is remote from the exhaust turbine, the thermal stressing is significantly lower than in the region between the entry of the connection lines and the exhaust turbine. As a result, the shut-off element has a significantly longer service life. Even if it is damaged, its components cannot destroy the exhaust turbine since the latter is arranged a long way from it. Moreover, the cross-sectional constriction of the interconnection conduit alone ensures effective operation of the internal combustion engine at full load, making it possible to continue operating the exhaust system even if the shut-off element were defective.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
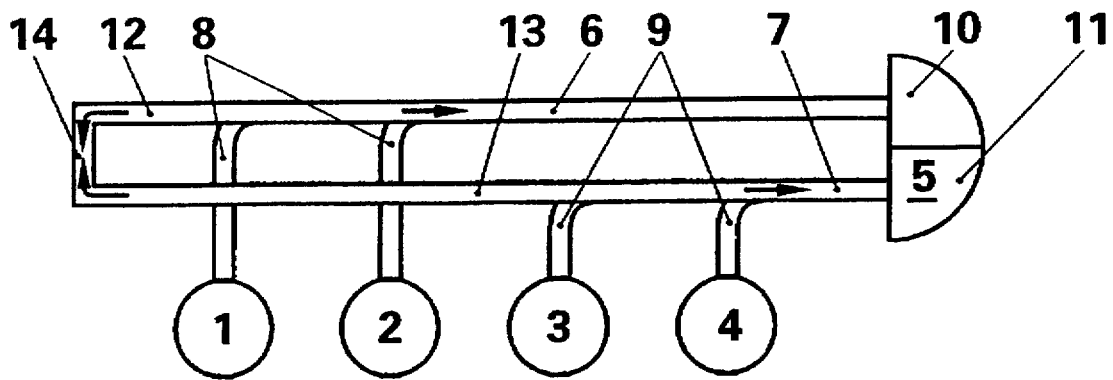
FIG. 1 shows a schematic representation of the exhaust system.

Referring now to the drawings, wherein like reference numerals designate identical or corresponding parts give out the several views, in which only those elements which are essential for an understanding of the invention are shown and in which the direction of flow of the working media is indicated by arrows, FIG. 1 shows four cylinders 1, 2, 3, 4 of an internal combustion engine designed as a four-stroke engine, which interact via an exhaust system with the exhaust turbine 5 of an exhaust turbocharger. The exhaust system comprises two shock pipes 6, 7, which are each connected by two connection lines 8 and 9, respectively, to the corresponding cylinders 1, 2 and cylinders 3, 4.

Downstream, the shock pipes 6, 7 each connect up to a separate gas inlet 10, 11 of the exhaust turbine 5. An extension piece 12, 13 is formed for each shock pipe 6, 7 and arranged upstream of the connection line 8, 9 furthest away from the exhaust turbine 5. Shock pipe 6 is connected to extension piece 12 and shock pipe 7 to extension piece 13. An interconnection conduit 14 is formed between the two extension pieces 12, 13.

Figure 2:
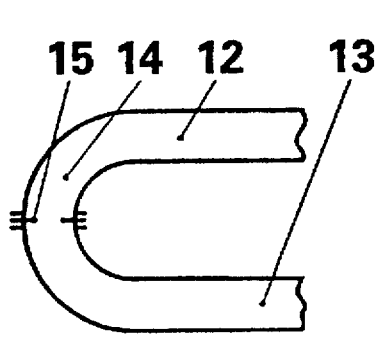
FIG. 2 shows an enlarged representation of a detail of FIG. 1 in the region of the connecting line.

In a first exemplary embodiment (FIG. 2), a cross-sectional constriction 15 designed as an orifice is arranged in the interconnection conduit 14. If exhaust gases are introduced into the first shock pipe 6 from cylinders 1 and 2, for example, the majority is passed on to the gas inlet 10 of the exhaust turbine 5. The other, smaller portion of the exhaust gases passes via extension piece 12, the interconnection conduit 14 and the orifice 15 arranged therein into extension piece 13 and finally into the second shock pipe 7. As a result, the pressure in the first shock pipe 6 is reduced and that in the second shock pipe 7 increased, i.e. a certain pressure equalization takes place. If exhaust gas is now introduced into the second shock pipe 7 from the other cylinders 3 and 4, this shock pipe is not empty since exhaust gases are still present from the first shock pipe 6. The pressure build-up is therefore relatively rapid, some of the exhaust gases passing via the interconnection conduit 14 into the first shock pipe 6. In this way, the pressure difference between the two shock pipes 6, 7 is reduced, resulting in smaller pressure fluctuations. Owing to the more uniform admission to the exhaust turbine 5, its efficiency increases, thereby improving the pressure-charging of the engine at full load. With an appropriately designed orifice 15, the exhaust system can be of a design optimized for partial load or full load.

Figure 3:
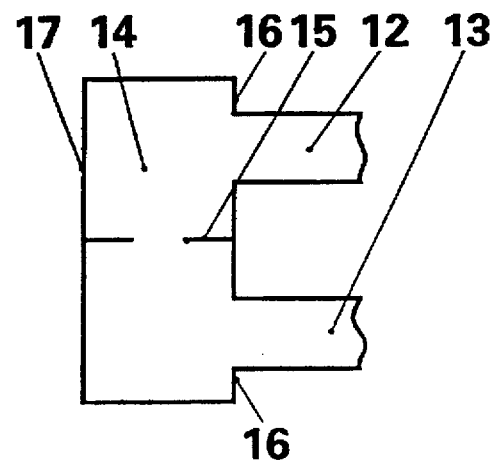
FIG. 3 shows a representation corresponding to FIG. 2, in a second embodiment.

In a second exemplary embodiment (FIG. 3), a jump 16 in cross-section is formed at the transition from the extension pieces 12, 13 to the interconnection conduit 14, and the interconnection conduit 14 has an additional volume 17. By virtue of this larger capacity, the pressure waves of the exhaust gases are damped, i.e. they act for longer. That portion of the exhaust gases which passes via the interconnection conduit 14 from the first shock pipe 6 into the second shock pipe 7 and vice versa requires more time for this. This further reduces the pressure fluctuations between the two shock pipes 6, 7, and the efficiency of the exhaust turbine 5 is further increased.

Figure 4:
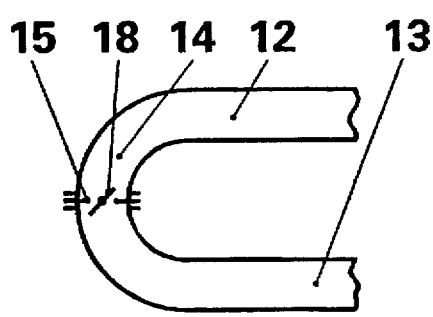
FIG. 4 shows a representation corresponding to FIG. 2, in a third embodiment.

FIG. 4 shows a third exemplary embodiment, in which a known shut-off element 18, designed as a butterfly, is arranged within the orifice 15. The butterfly 18 can be switched between an open position at full load and a closed position at partial load. For this purpose, it is connected to a control system (not shown) which is dependent on the boost pressure, on the engine load and/or the engine speed. By virtue of this arrangement, the exhaust system can be switched from the shock-wave process to the pulse-converter process depending on the operating state.

Figure 5:
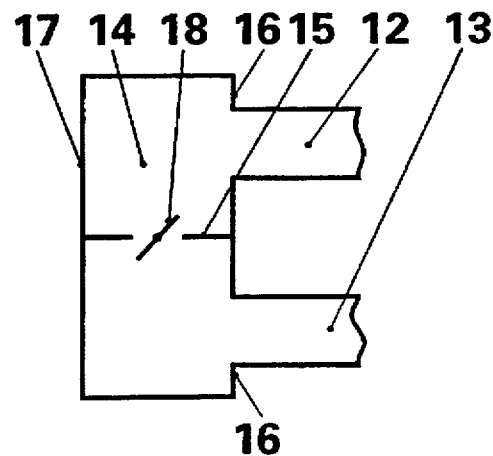
FIG. 5 shows a representation corresponding to FIG. 3, in a fourth embodiment.

In a fourth exemplary embodiment (FIG. 5), the orifice 15 is again provided with a butterfly 18 and the interconnection conduit 14 likewise has the additional volume 17. This combines all the advantages, mentioned hitherto, of the exhaust system and this solution thus allows the greatest variability in relation to the operating state of the engine.

It is, of course, possible to connect not only four-stroke engines but, especially, relatively small two-stroke engines to an exhaust system according to the invention. The invention is likewise not restricted to engines with four cylinders or to solutions with just two shock pipes 6, 7 and just one interconnection conduit 14.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An exhaust system for a turbocharged internal combustion engine, comprising:

a) at least two separate shock pipes supplied by a plurality of cylinders of the internal combustion engine and connected to an exhaust turbine of the exhaust turbocharger,
   b) a plurality of connection lines which connect the cylinders to the respective shock pipes,
   c) at least one interconnection conduit formed between the shock pipes,
   d) first and second extension pieces for the shock pipes arranged upstream of the connection lines furthest away from the exhaust turbine,
   e) each shock pipe connected to a corresponding extension piece,
   f) said at least one interconnection conduit formed between said first and second extension pieces,
   g) each at least one interconnection conduit having only one cross-sectional area constriction,
   h) a first portion of said interconnection conduit being directly fluidly adjacent said first extension piece and a second portion of said interconnection conduit being direct fluid adjacent said second extension piece;
   i) wherein exhaust flowing across said cross-sectional area constriction flows directly from said first portion of said interconnection conduit to said second portion of said interconnection conduit.

2. The exhaust system as claimed in claim 1, wherein a respective jump in cross-section is formed at the transition from the extension pieces to the interconnection conduit and each interconnection conduit has an additional volume.

3. The exhaust system as claimed in claim 1, wherein a shut-off element which can be adjusted between an open position for higher speeds of the internal combustion engine and a closed position for low speeds is arranged in the cross-sectional constriction of the interconnection conduit.

4. The exhaust system as claimed in claim 1, wherein said cross-sectional constriction comprises an orifice.

5. The exhaust system as claimed in claim 1, wherein said at least one interconnection conduit is formed between two extension pieces.

* * * * *